US006276889B1

United States Patent
Dortch et al.

(10) Patent No.: US 6,276,889 B1
(45) Date of Patent: Aug. 21, 2001

(54) SPARE TIRE STORAGE BRACKET ASSEMBLY

(76) Inventors: Fred Dortch; Alma Dortch, both of 9545 S. Calumet Ave., Chicago, IL (US) 60628

( * ) Notice: Subject to any disclaimer, the term of this patent is extended or adjusted under 35 U.S.C. 154(b) by 0 days.

(21) Appl. No.: 09/675,136

(22) Filed: Sep. 29, 2000

(51) Int. Cl.$^7$ .................................................. B62D 43/04
(52) U.S. Cl. ........................................ 414/463; 224/42.24
(58) Field of Search .............................. 224/42.2, 42.23, 224/42.24, 42.26; 414/463, 464, 465, 466; 254/323

(56) References Cited

U.S. PATENT DOCUMENTS

| D. 378,364 | 3/1997 | Clifton . | |
|---|---|---|---|
| 3,865,264 | * 2/1975 | Kuhns | 414/463 |
| 4,111,344 | * 9/1978 | MacDonald | 224/42.24 |
| 4,282,995 | 8/1981 | Austin . | |
| 4,498,835 | * 2/1985 | Yasue et al. | 414/463 |
| 4,548,540 | 10/1985 | Renfro . | |
| 4,884,785 | 12/1989 | Denman et al. . | |
| 4,997,164 | * 3/1991 | Kito et al. | 254/323 |
| 5,330,313 | 7/1994 | Easterwood . | |
| 5,638,710 | 6/1997 | Howard, Jr. et al. . | |
| 5,845,825 | * 12/1998 | Utsuno et al. | 224/42.24 |

FOREIGN PATENT DOCUMENTS

963492 * 9/1955 (DE) ..................................... 414/463

* cited by examiner

Primary Examiner—Janice L. Krizek

(57) ABSTRACT

A spare tire storage bracket assembly for safely securing a spare tire under a vehicle includes a main member designed to be coupled to a selectively extendable and retractable cable of a vehicle. The main member includes a pair of outer portions designed to be positioned to engage a lip around a central opening of a rim of a spare tire of the vehicle. An attachment assembly holds the main member against the spare tire whereby the main member is prevented from being passed through the central opening. The attachment assembly includes a plate member that has a pair of apertures. The attachment assembly further includes a pair of screws, each of the screws includes a head portion and a threaded portion, and the threaded portion of each of the screws is insertable through an associated one of the apertures. The apertures are positioned such that the threaded portions are inserted through the attachment holes in the rim of the spare tire when the plate member is positioned adjacent the rim of the spare tire. The attachment assembly further includes a pair of nut members, each of the nut members are engaged to an associated one of the screws whereby the plate member is engageable to the rim of the spare tire for holding the main member against the rim in a static position relative to the spare tire whereby the spare tire is selectively raisable and lowerable when the cable is retracted and extended.

8 Claims, 3 Drawing Sheets

SPARE TIRE STORAGE BRACKET ASSEMBLY

BACKGROUND OF THE INVENTION

1. Field of the Invention

The present invention relates to spare tire brackets and more particularly pertains to a new spare tire storage bracket assembly for safely securing a spare tire under a vehicle.

2. Description of the Prior Art

The use of spare tire brackets is known in the prior art. More specifically, spare tire brackets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,638,710; U.S. Pat. No. 4,548,540; U.S. Pat. No. 5,330,313; U.S. Pat. No. 4,282,995; U.S. Pat. No. 4,884,785; U.S. Pat. No. Des 378,364.

While these devices fulfill their respective, particular objectives and requirements, the aforementioned patents do not disclose a new spare tire storage bracket assembly. The inventive device includes a spare tire storage bracket assembly that includes a main member designed to be coupled to a selectively extendable and retractable cable of a vehicle. The main member includes a pair of outer portions designed to be positioned to engage a lip around a central opening of a rim of a spare tire of the vehicle. An attachment assembly holds the main member against the spare tire whereby the main member is prevented from being passed through the central opening. The attachment assembly includes a plate member that has a pair of apertures. The attachment assembly further includes a pair of screws, each of the screws includes a head portion and a threaded portion, and the threaded portion of each of the screws is insertable through an associated one of the apertures. The apertures are positioned such that the threaded portions are inserted through the attachment holes in the rim of the spare tire when the plate member is positioned adjacent the rim of the spare tire. The attachment assembly further includes a pair of nut members, each of the nut members are engaged to an associated one of the screws whereby the plate member is engageable to the rim of the spare tire for holding the main member against the rim in a static position relative to the spare tire whereby the spare tire is selectively raisable and lowerable when the cable is retracted and extended.

In these respects, the spare tire storage bracket assembly according to the present invention substantially departs from the conventional concepts and designs of the prior art, and in so doing provides an apparatus primarily developed for the purpose of safely securing a spare tire under a vehicle.

SUMMARY OF THE INVENTION

In view of the foregoing disadvantages inherent in the known types of spare tire brackets now present in the prior art, the present invention provides a new spare tire storage bracket assembly construction wherein the same can be utilized for safely securing a spare tire under a vehicle.

The general purpose of the present invention, which will be described subsequently in greater detail, is to provide a new spare tire storage bracket assembly apparatus and method which has many of the advantages of the spare tire brackets mentioned heretofore and many novel features that result in a new spare tire storage bracket assembly which is not anticipated, rendered obvious, suggested, or even implied by any of the prior art spare tire brackets, either alone or in any combination thereof.

To attain this, the present invention generally comprises a main member designed to be coupled to a selectively extendable and retractable cable of a vehicle. The main member includes a pair of outer portions designed to be positioned to engage a lip around a central opening of a rim of a spare tire of the vehicle.

An attachment assembly holds the main member against the spare tire whereby the main member is prevented from being passed through the central opening. The attachment assembly includes a plate member that has a pair of apertures.

The attachment assembly further includes a pair of screws, each of the screws includes a head portion and a threaded portion, the threaded portion of each of the screws is insertable through an associated one of the apertures. The apertures are positioned such that the threaded portions are inserted through the attachment holes in the rim of the spare tire when the plate member is positioned adjacent the rim of the spare tire.

The attachment assembly further includes a pair of nut members, each of the nut members are engaged to an associated one of the screws whereby the plate member is engageable to the rim of the spare tire for holding the main member against the rim in a static position relative to the spare tire whereby the spare tire is selectively raisable and lowerable when the cable is retracted and extended.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spare tire storage bracket assembly apparatus and method which has many of the advantages of the spare tire brackets mentioned heretofore and many novel features that result in a new spare tire storage bracket assembly which is not anticipated, rendered obvious, suggested, or even implied by any of the prior art spare tire brackets, either alone or in any combination thereof.

It is another object of the present invention to provide a new spare tire storage bracket assembly which may be easily and efficiently manufactured and marketed.

It is a further object of the present invention to provide a new spare tire storage bracket assembly which is of a durable and reliable construction.

An even further object of the present invention is to provide a new spare tire storage bracket assembly which is susceptible of a low cost of manufacture with regard to both materials and labor, and which accordingly is then susceptible of low prices of sale to the consuming public, thereby making such spare tire storage bracket assembly economically available to the buying public.

Still yet another object of the present invention is to provide a new spare tire storage bracket assembly which provides in the apparatuses and methods of the prior art some of the advantages thereof, while simultaneously overcoming some of the disadvantages normally associated therewith.

Still another object of the present invention is to provide a new spare tire storage bracket assembly for safely securing a spare tire under a vehicle.

Yet another object of the present invention is to provide a new spare tire storage bracket assembly which includes a main member designed to be coupled to a selectively extendable and retractable cable of a vehicle. The main member includes a pair of outer portions designed to be positioned to engage a lip around a central opening of a rim of a spare tire of the vehicle. An attachment assembly holds the main member against the spare tire whereby the main member is prevented from being passed through the central opening. The attachment assembly includes a plate member that has a pair of apertures. The attachment assembly further includes a pair of screws, each of the screws includes a head portion and a threaded portion, and the threaded portion of each of the screws is insertable through an associated one of the apertures. The apertures are positioned such that the threaded portions are inserted through the attachment holes in the rim of the spare tire when the plate member is positioned adjacent the rim of the spare tire. The attachment assembly further includes a pair of nut members, each of the nut members are engaged to an associated one of the screws whereby the plate member is engageable to the rim of the spare tire for holding the main member against the rim in a static position relative to the spare tire whereby the spare tire is selectively raisable and lowerable when the cable is retracted and extended.

Still yet another object of the present invention is to provide a new spare tire storage bracket assembly that eliminates the possibility of a person cutting the cable and stealing the tire that is secured underneath the vehicle.

Even still another object of the present invention is to provide a new spare tire storage bracket assembly that is easy to install and allows a user to easily stow and retrieve their spare tire from underneath a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than hose set forth above will become apparent when consideration is given to the following detailed description thereof. Such description makes reference to the annexed drawings wherein.

DESCRIPTION OF THE PREFERRED EMBODIMENT

Figure 1:
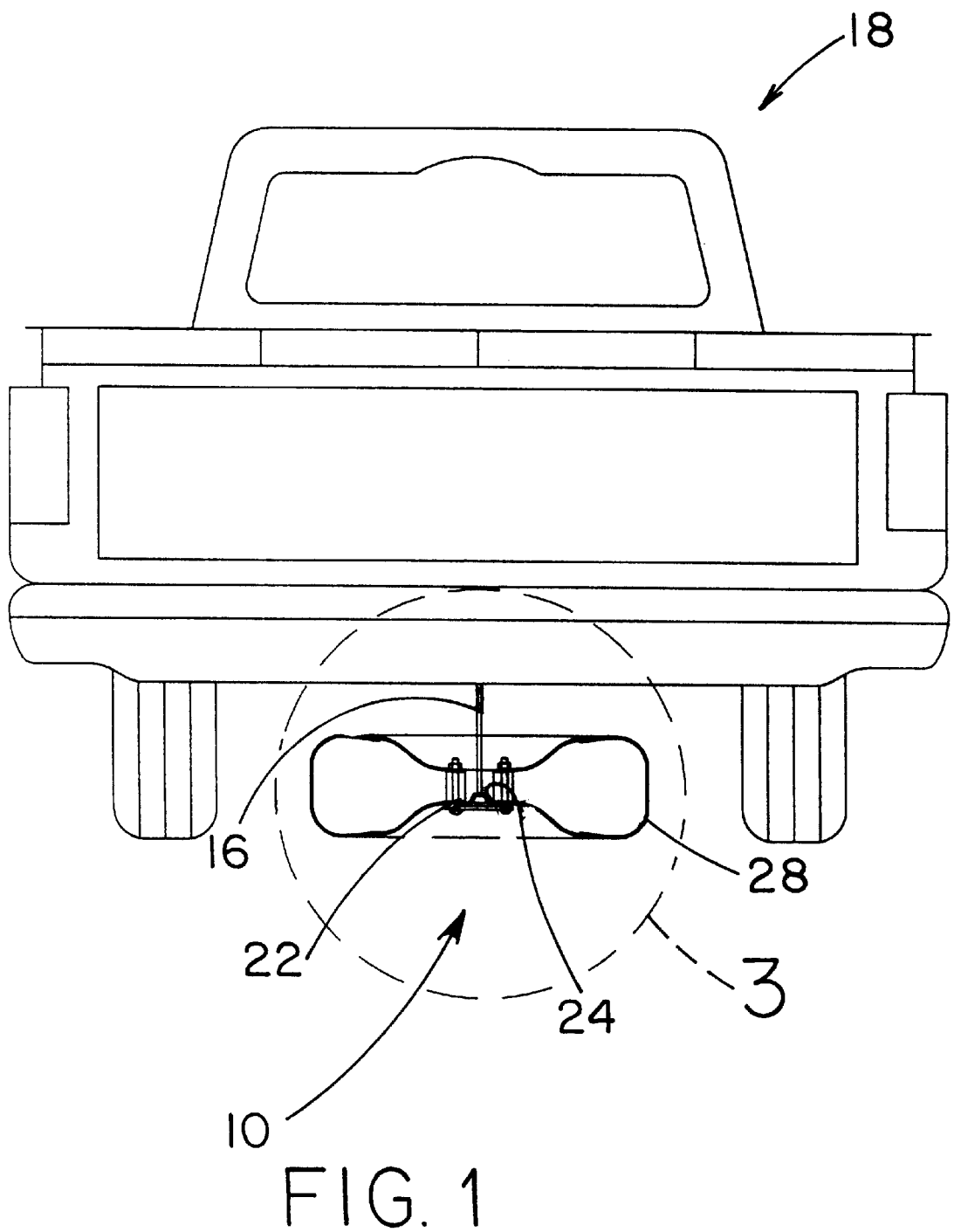
FIG. 1 is a perspective view of a new spare tire storage bracket assembly according to the present invention.
Figure 2:
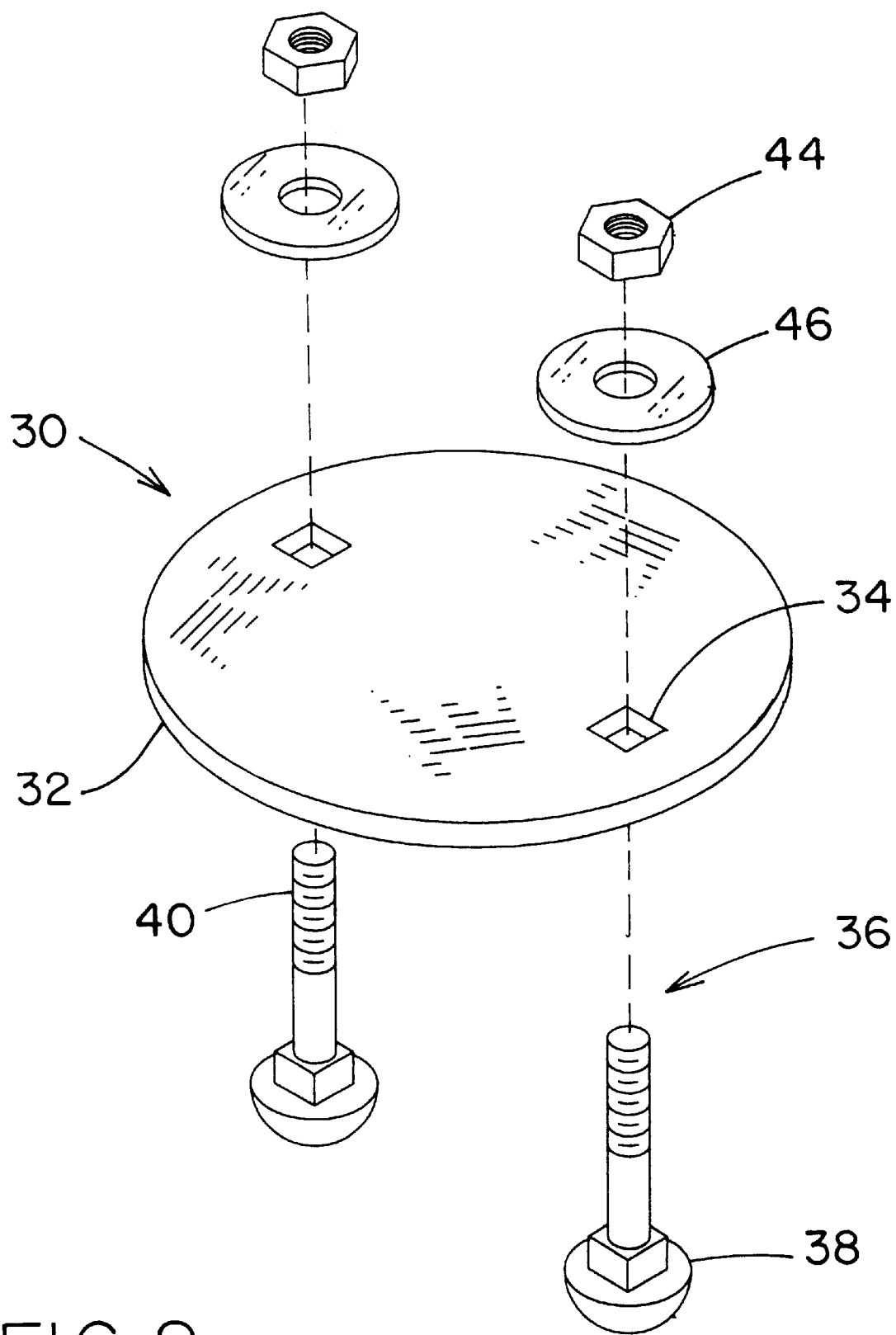
FIG. 2 is an expanded view of the present invention.
Figure 3:
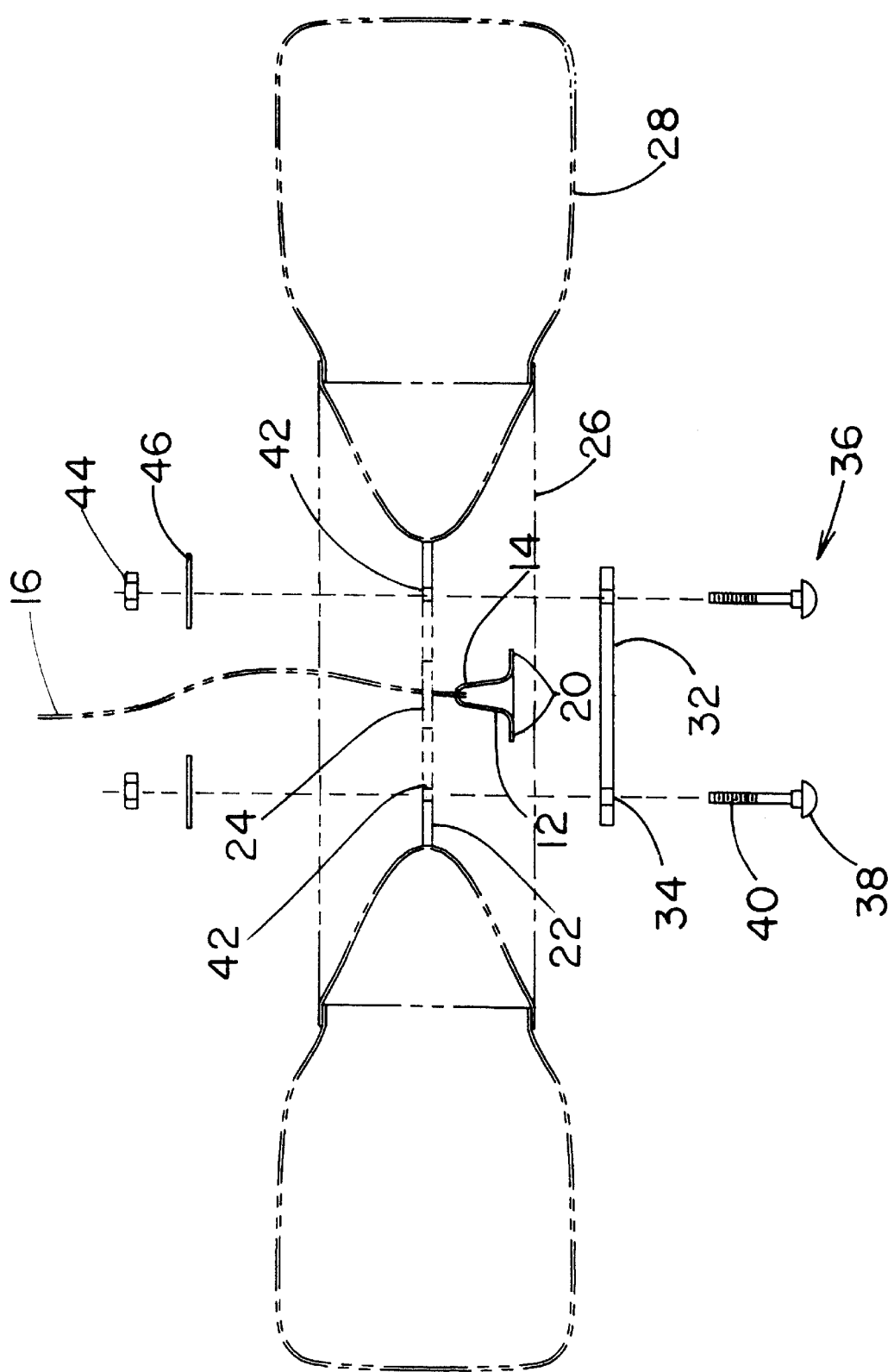
FIG. 3 is a side view of the present invention.

With reference now to the drawings, and in particular to FIGS. 1 through 3 thereof, a new spare tire storage bracket assembly embodying the principles and concepts of the present invention and generally designated by the reference numeral 10 will be described.

As best illustrated in FIGS. 1 through 3, the spare tire storage bracket assembly 10 generally includes a main member 12 that has a medial portion 14 designed to be coupled to a selectively extendable and retractable cable 16 of a vehicle 18. The main member 12 includes a pair of outer portions 20 designed to be positioned to engage a lip 22 around a central opening 24 of a rim 26 of a spare tire 28 of the vehicle 18.

The main member 12 is a curved elongated strip, which includes a width less than a diameter of the central opening 24 of the spare tire 28 whereby the main member 12 is selectively insertable through the central opening 24.

An attachment assembly 30 holds the main member 12 against the spare tire 28 whereby the main member 12 is prevented from passing through the central opening 24. The attachment assembly 30 includes a plate member 32 that has a pair of apertures 34.

The attachment assembly 30 further includes a pair of screws 36; each of the screws 36 includes a head portion 38 and a threaded portion 40. The threaded portion 40 of each of the screws 36 are insertable through an associated one of the apertures 34, the apertures 34 are positioned such that the threaded portions 40 are insertable through attachment holes 42 in the rim 26 of the spare tire 28 when the plate member 32 is positioned adjacent the rim 26 of the spare tire 28.

The attachment assembly 30 further includes a pair of nut members 44, each of the nut members 44 are engageable to an associated one of the screws 36 whereby the plate member 32 is engageable to the rim 26 of the spare tire 28 for holding the main member 12 against the rim 26 in a static position relative to the spare tire 28 whereby the spare tire 28 is selectively raisable and lowerable when the cable 16 is retracted and extended.

Each of the nut members 44 is a wing nut for facilitating manual engagement of each the wing nut to the threaded portion 40 of the associated screw 36. The apertures 34 are positioned in diametric opposition to each other. A pair of locking washers 46 are securable between an associated nut member 44 and the rim 26 of the spare tire 28 when the associated screw 36 is inserted through the plate member 32 and the rim 26 of the spare tire 28 and the nut member 44 is engaged to the associated screw 36.

In use, a user places the metal plate member on the bottom side of the rim of the spare tire, the two bolts are inserted through the bolt pattern of the bottom of the rim of the spare tire and fastened on the top side of the rim with two washers and wingnuts.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spare tire storage bracket assembly comprising:

a main member adapted for coupling to a selectively extendable and retractable cable of a vehicle, said main member having a pair of outer portions adapted for being positioned to engage a lip around a central opening of a rim of a spare tire of the vehicle;

an attachment assembly for holding said main member against the spare tire whereby said main member is prevented from passing through the central opening, said attachment assembly including a plate member having a pair of apertures;

said attachment assembly further including a pair of screws, each of said screws having a head portion and a threaded portion, said threaded portion of each of said screws being insertable through an associated one of said apertures, said apertures being positioned such that said threaded portions are insertable through attachment holes in the rim of the spare tire when the plate member is positioned adjacent the rim of the spare tire;

said attachment assembly further including a pair of nut members, each of said nut members being engageable with an associated one of said screws whereby said plate member is engageable with the rim of the spare tire for holding the main member against the rim in a static position relative to the spare tire whereby the spare tire is selectively raisable and lowerable when the cable is retracted and extended.

2. The spare tire storage bracket assembly of claim 1, wherein:

each of said apertures has a straight edge portion; and each of said head portions of said screws has a lower portion having a shape complementary to said associated aperture such that said lower portion is insertable into said associated aperture whereby said straight edge portion prevents rotation of said screw in said aperture.

3. The spare tire storage bracket assembly of claim 1, wherein:

each of said apertures has a plurality of straight edge portions arranged to form a geometric shape; and each of said head portions of said screws has a lower portion having a shape complementary to said associated aperture such that said lower portion is insertable into said associated aperture whereby said straight edge portion prevents rotation of said screw in said aperture.

4. The spare tire storage bracket assembly of claim 1, wherein:

said apertures are positioned in diametric opposition to each other.

5. The spare tire storage bracket assembly of claim 1, further comprising:

a pair of washers, each of said washers being securable between an associated nut member and the rim of the spare tire when said associated screw is inserted through said plate member and the rim of the spare tire and the nut member is engaged to said associated screw.

6. A spare tire storage bracket assembly comprising:

a main member having a medial portion adapted for coupling to a selectively extendable and retractable cable of a vehicle, said main member having a pair of outer portions adapted for being positioned to engage a lip around a central opening of a rim of a spare tire of the vehicle;

said main member being a curved elongated strip, said strip having a width less than a diameter of the central opening of the spare tire whereby said main member is selectively insertable through the central opening;

an attachment assembly for holding said main member against the spare tire whereby said main member is prevented from passing through the central opening, said attachment assembly including a plate member having a pair of apertures;

said attachment assembly further including a pair of screws, each of said screws having a head portion and a threaded portion, said threaded portion of each of said screws being insertable through an associated one of said apertures, said apertures being positioned such that said threaded portions are insertable through attachment holes in the rim of the spare tire when the plate member is positioned adjacent the rim of the spare tire;

said attachment assembly further including a pair of nut members, each of said nut members being engageable with an associated one of said screws whereby said plate member is engageable with the rim of the spare tire for holding the main member against the rim in a static position relative to the spare tire whereby the spare tire is selectively raisable and lowerable when the cable is retracted and extended;

said apertures being positioned in diametric opposition to each other; and a pair of washers, each of said washers being securable between an associated nut member and the rim of the spare tire when said associated screw is inserted through said plate member and the rim of the spare tire and the nut member is engaged to said associated screw.

7. The spare tire storage bracket assembly of claim 6, wherein:

each of said apertures has a plurality of straight edge portions arranged to form a geometric shape; and each of said head portions of said screws has a lower portion having a shape complementary to said associated aperture such said lower portion is insertable into said associated aperture whereby said straight edge portions prevent rotation of said screw in said aperture.

8. The spare tire storage bracket assembly of claim 6, wherein:

each of said apertures has a straight edge portion; and each of said head portions of said screws has a lower portion having a shape complementary to said associated aperture such said lower portion is insertable into said associated aperture whereby said straight edge portion prevents rotation of said screw in said aperture.

\* \* \* \* \*